United States Patent
Hitchcock et al.

(10) Patent No.: US 10,773,389 B2
(45) Date of Patent: *Sep. 15, 2020

(54) ROBOTIC SYSTEMS AND METHODS IN PREDICTION AND PRESENTATION OF RESOURCE AVAILABILITY

(71) Applicant: OneMarket Network LLC, San Francisco, CA (US)

(72) Inventors: Riley James Hitchcock, Tampa, FL (US); Sarah A. McElroy, Seattle, WA (US); Darlene A Veloso, Jersey City, NJ (US); Edmund James Golby Spencer, New York, NY (US); Corrine C Barchanowicz, W Los Angeles, CA (US); Aram Marabyan, North Hollywood, CA (US); Erik Davin Kokkonen, San Francisco, CA (US); Joshua Lynton Lowy, San Francisco, CA (US); Brian Porter, Culver City, CA (US)

(73) Assignee: OneMarket Network LLC, San Francisco, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/859,225

(22) Filed: Dec. 29, 2017

(65) Prior Publication Data

US 2018/0117770 A1 May 3, 2018

Related U.S. Application Data

(63) Continuation of application No. 14/757,986, filed on Dec. 24, 2015, now Pat. No. 10,016,897.

(Continued)

(51) Int. Cl.
*B25J 9/16* (2006.01)
*G06Q 30/06* (2012.01)
(Continued)

(52) U.S. Cl.
CPC .............. *B25J 9/1697* (2013.01); *G06N 5/04* (2013.01); *G06Q 10/087* (2013.01);
(Continued)

(58) Field of Classification Search
USPC .......................... 700/245–264; 901/1, 46, 47
See application file for complete search history.

(56) References Cited

U.S. PATENT DOCUMENTS

| | | | |
|---|---|---|---|
| 7,336,950 B2* | 2/2008 | Pettine, Jr. ............ | H04W 60/00 455/435.1 |
| 7,860,647 B2 | 12/2010 | Amano | |

(Continued)

FOREIGN PATENT DOCUMENTS

TW          201024936 A        7/2010

OTHER PUBLICATIONS

"U.S. Appl. No. 14/757,986, Non Final Office Action dated Mar. 24, 2017", 15 pgs.

(Continued)

*Primary Examiner* — Jonathan L Sample
(74) *Attorney, Agent, or Firm* — Kwan & Olynick LLP

(57) ABSTRACT

Systems and methods to predict and present availability and value of retail spaces in shopping malls. Robots are dispatched to temporary retail spaces to collect at least a portion of operation data stored in a database with leasing data of temporary retail spaces in a mall, tenant coordination data, and subscriber data. A web-based application predicts availability of the temporary retail spaces in the mall based on the leasing data, the tenant coordination data, and the operation data. The web-based application includes an interactive plan of the mall as a user interface for subscribers to access data related to the temporary retail spaces, and process applications for leasing the temporary retail spaces.

20 Claims, 6 Drawing Sheets

Related U.S. Application Data

(60) Provisional application No. 62/218,172, filed on Sep. 14, 2015.

(51) Int. Cl.
  *G06Q 10/08* (2012.01)
  *G06N 5/04* (2006.01)

(52) U.S. Cl.
  CPC ......... *G06Q 30/0645* (2013.01); *Y10S 901/01* (2013.01); *Y10S 901/47* (2013.01)

(56) References Cited

U.S. PATENT DOCUMENTS

| | | | |
|---|---|---|---|
| 8,055,296 B1* | 11/2011 | Persson | G02B 27/017 455/456.1 |
| 8,179,816 B1 | 5/2012 | Vaidyanathan et al. | |
| 9,160,783 B2* | 10/2015 | Pinter | H04L 63/029 |
| 9,246,573 B1 | 1/2016 | Gettings et al. | |
| 9,262,681 B1* | 2/2016 | Mishra | G06K 9/00771 |
| 9,338,622 B2* | 5/2016 | Bjontegard | G06T 19/006 |
| 9,411,337 B1 | 8/2016 | Theobald et al. | |
| 9,426,731 B1* | 8/2016 | Uy | H04W 48/18 |
| 9,432,908 B2* | 8/2016 | Wohlert | H04L 65/1016 |
| 9,465,390 B2* | 10/2016 | Mason | G05D 1/0291 |
| 9,469,030 B2* | 10/2016 | Wang | B25J 11/009 |
| 9,514,204 B2* | 12/2016 | Zachar | G06Q 50/163 |
| 9,527,217 B1 | 12/2016 | Lowy | |
| 9,741,010 B1* | 8/2017 | Heinla | G06Q 10/083 |
| 2002/0198656 A1 | 12/2002 | Ford et al. | |
| 2005/0054332 A1 | 3/2005 | Sakagami et al. | |
| 2005/0097005 A1 | 5/2005 | Fargo | |
| 2007/0018811 A1 | 1/2007 | Gollu | |
| 2007/0067373 A1* | 3/2007 | Higgins | G06F 11/3013 |
| 2007/0112461 A1* | 5/2007 | Zini | G06K 7/0008 700/245 |
| 2008/0077511 A1 | 3/2008 | Zimmerman | |
| 2009/0143913 A1* | 6/2009 | Kim | B25J 19/023 700/259 |
| 2009/0149992 A1 | 6/2009 | Ohno | |
| 2009/0265251 A1 | 10/2009 | Dunlap et al. | |
| 2010/0094463 A1 | 4/2010 | Okabayashi et al. | |
| 2012/0069131 A1* | 3/2012 | Abelow | G06Q 10/067 348/14.01 |
| 2012/0173018 A1 | 7/2012 | Allen et al. | |
| 2012/0173139 A1 | 7/2012 | Judd et al. | |
| 2012/0185095 A1* | 7/2012 | Rosenstein | G05D 1/0227 700/259 |
| 2012/0226467 A1 | 9/2012 | Miller et al. | |
| 2013/0317642 A1 | 11/2013 | Asaria et al. | |
| 2014/0101885 A1 | 4/2014 | Ko | |
| 2014/0244094 A1 | 8/2014 | Kim et al. | |
| 2014/0277691 A1 | 9/2014 | Jacobus et al. | |
| 2014/0365251 A1 | 12/2014 | Tejima | |
| 2014/0365258 A1* | 12/2014 | Vestal | G06Q 10/063114 705/7.15 |
| 2015/0088310 A1* | 3/2015 | Pinter | B25J 9/1676 700/253 |
| 2015/0100461 A1 | 4/2015 | Baryakar et al. | |
| 2015/0142594 A1* | 5/2015 | Lutnick | G06Q 50/28 705/21 |
| 2015/0186869 A1* | 7/2015 | Winters | G06Q 10/0834 705/26.81 |
| 2015/0202770 A1* | 7/2015 | Patron | G05D 1/024 700/245 |
| 2015/0234386 A1* | 8/2015 | Zini | G05D 1/0274 701/26 |
| 2015/0287318 A1* | 10/2015 | Nair | G05B 19/418 340/5.52 |
| 2016/0129597 A1 | 5/2016 | Wang et al. | |
| 2016/0132059 A1* | 5/2016 | Mason | G05B 19/41815 701/28 |
| 2016/0144505 A1* | 5/2016 | Fong | B25J 9/1697 700/250 |
| 2016/0257004 A1* | 9/2016 | Al-Shaikhi | G05D 1/0274 |
| 2017/0028564 A1 | 2/2017 | Lowy | |
| 2017/0072568 A1 | 3/2017 | Hitchcock et al. | |
| 2017/0075962 A1 | 3/2017 | Hitchcock et al. | |

OTHER PUBLICATIONS

"U.S. Appl. No. 14/757,986, Notice of Allowance dated Oct. 5, 2017", 7 pgs.

"Decision tree learning", Wikipedia, Retrieved on Jul. 28, 2016 from https://en.wikipedia.org/wiki/Decision tree learning, last modified on Jul. 28, 2016.

"Ensemble learning", Wikipedia, retrieved on Jul. 28, 2016 from https://en.wikipedia.org/wiki/Ensemble_learning, last modified on Jun. 1, 2016.

"European Application Serial No. 16181530.3, Search Report dated Dec. 8, 2016", 7 pgs.

"Mode (statistics)", Wikipedia, retrieved on Jul. 28, 2016 from https://en.wikipedia.org/wiki/Mode_(statistics), last modified on Jul. 3, 2016.

"Random forest", Wikipedia, retrieved on Jul. 28, 2016 from https://en.wikipedia.org/wiki/Random_forest, last modified on Jul. 19, 2016.

"Regression analysis", Wikipedia, retrieved on Jul. 28, 2016 from https://en.wikipedia.org/wiki/Regression_ analysis, last modified on Jul. 3, 2016.

"Scikit-learn user guide", "sklearn.ensemble.RandomeForestClassifier", section 3.2.4.3.1, retrieved on Aug. 2, 2016 from http://scikit-learn.org/stable/modules/generated/sklearn.ensemble.RandomForestClassifier.html, 2010-2014.

"Statistical classification", Wikipedia, retrieved on Jul. 28, 2016 from https://en.wikipedia.org/wiki/Statistical_ classification, last modified on Jul. 17, 2016.

Porter, Brian et al., "U.S. Appl. No. 15/222,434, filed Jul. 28, 2016", 42 pgs.

\* cited by examiner

ROBOTIC SYSTEMS AND METHODS IN PREDICTION AND PRESENTATION OF RESOURCE AVAILABILITY

RELATED APPLICATIONS

This application is a continuation of and claims benefit under 35 U.S.C. § 120 to U.S. application Ser. No. 14/757,986, filed Dec. 24, 2015 and titled "ROBOTIC SYSTEMS AND METHODS IN PREDICTION AND PRESENTATION OF RESOURCE AVAILABILITY", which claims the benefit of the filing date of Prov. U.S. Pat. App. Ser. No. 62/218,172, filed on Sep. 14, 2015 and titled "SYSTEMS AND METHODS TO PREDICT AND PRESENT AVAILABILITY OF RESOURCES", both of which are hereby incorporated herein by reference.

The present application relates to U.S. patent application Ser. No. 14/946,635, filed Nov. 19, 2015, the entire disclosure of which application is hereby incorporated herein by reference.

FIELD OF THE TECHNOLOGY

At least some embodiments of the present disclosure relate to robots having indoor location determination devices to guide their movements in a building structure, and their usages in collecting information for the prediction of the availability of resources, such as spaces.

BACKGROUND

U.S. Pat. App. Pub. No. 2009/0149992 discloses a robot capable of traveling within a predetermined pathway area.

U.S. Pat. App. Pub. No. 2010/0094463 discloses a robot having a position recognition section that recognizes a current position of the robot within a guide zone. The robot is controlled to move to each of guide locations in the guide zone. At each of the guide locations, the robot transmits contents information corresponding to the guide location to a mobile terminal held by a person to be guided near the robot.

U.S. Pat. No. 7,860,647 discloses a traffic condition prediction table used to predict vacancy of a parking lot as an accommodating facility for presentation on a navigation device.

U.S. Pat. App. Pub. No. 20140365251 discloses a vacancy rate calculation apparatus for tables in a restaurant.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
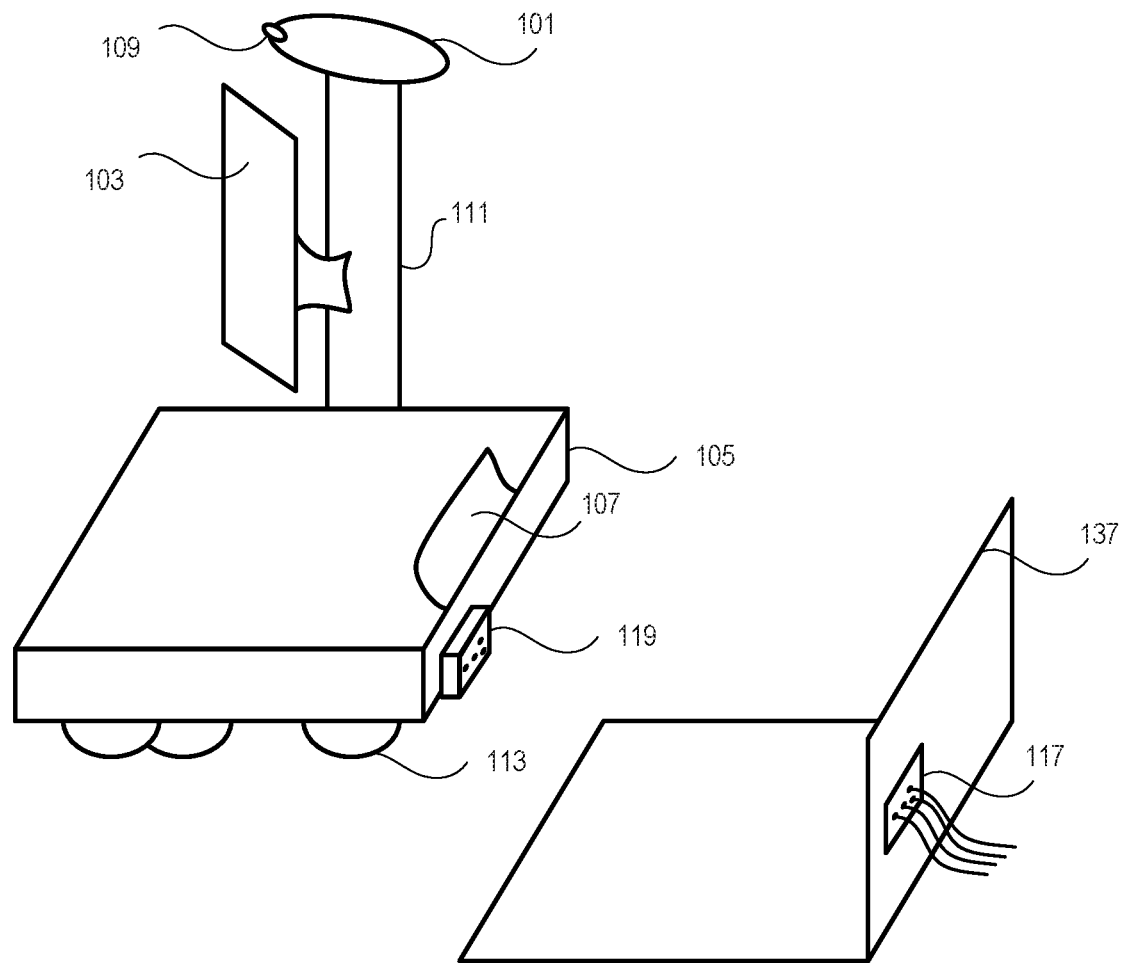
FIG. 1 shows a robot according to one embodiment.

FIG. 1 shows a robot according to one embodiment.

In FIG. 1, a robot (101) includes a base (105), a body (111), a touch screen (103) and a camera (109). In one embodiment, the robot (101) is programmable to travel within an area, such as a shopping mall, capture information and/or photo images, provide a user interface for interaction, and/or transport items.

In FIG. 1, the camera (109) is mounted directly on the body (111). In some alternative embodiments, the camera (109) is integrated with the touch screen (103). For example, the touch screen (103) can be implemented using a tablet computer having a camera (109) and running an operating system for mobile devices; and a mobile application running in the tablet computer is configured to control the operations of the robot (101). In some embodiments, the computer configured to control the operations of the robot (101) is integrated within the body (111) or the base (105). In some embodiments, the robot (101) includes a wireless communications device (e.g., an antenna and a transceiver for a wireless local area network, or a wireless personal area network) for a communication connection to a remote server.

In FIG. 1, the robot (101) has a touch screen (103) within which a controller of the robot (101) may be installed. Alternatively, the controller of the robot (101) may be disposed within the body (111) or the base (105).

In FIG. 1, the base (105) of the robot (101) includes a moving mechanism (113) controllable to move the robot (101) in a pathway area, such as the hallways in a shopping mall, or a sidewalk of a strip mall. For example, the moving mechanisms disclosed in U.S. Pat. App. Pub. No. 2009/0149992 or 2010/0094463 can be used, the disclosure of which is incorporated herein by reference.

In one embodiment, the moving mechanism (113) in the base (105) of the robot (101) is configured to rotate the robot (101) as a whole about a vertical line at a location to allow the camera (109) to take a 360 degree photo image of the surrounding.

In one embodiment, the base (105) and the body (111) are configured to allow the body (111) to rotate about a vertical line passing through the center of the base (105). Thus, the base (105) can be controlled to stay at location; and the body (111) can be controlled to rotate about the vertical line to take a 360 degree photo image of the surrounding. In a further embodiment, the camera (109) is mounted on a track on the body (111) and configured to move alone the track to take a 360 degree photo image of the surrounding.

The 360 degree photo image can be obtained via a camera taking a plurality of photo images while rotating about the vertical line and then digitally stitching the images together to form a photo image having a 360 degree view of the surrounding at the location of the robot (101).

Alternatively, the camera may capture one or more vertical lines of image pixels at a time while the robot (101) rotates about the vertical axis. The vertical lines captured at different time instances while the robot (101) is at different angles with respect to the vertical axis form an image having the 360 degree view of the surrounding.

In one embodiment, the robot (101) (or a server) is configured to analyze the image to extract information about the location, such as the advertisements, notices and/or deals posted on the store front of a retailer, the number of customers in the surrounding area, etc.

In one embodiment, the robot (101) further includes storage spaces (107) configured to carry items for delivery by the robot (101). Items stored in the storage spaces (107) can be secured with a locked door or latch to prevent theft, unauthorized access, temper, etc.

Figure 3:
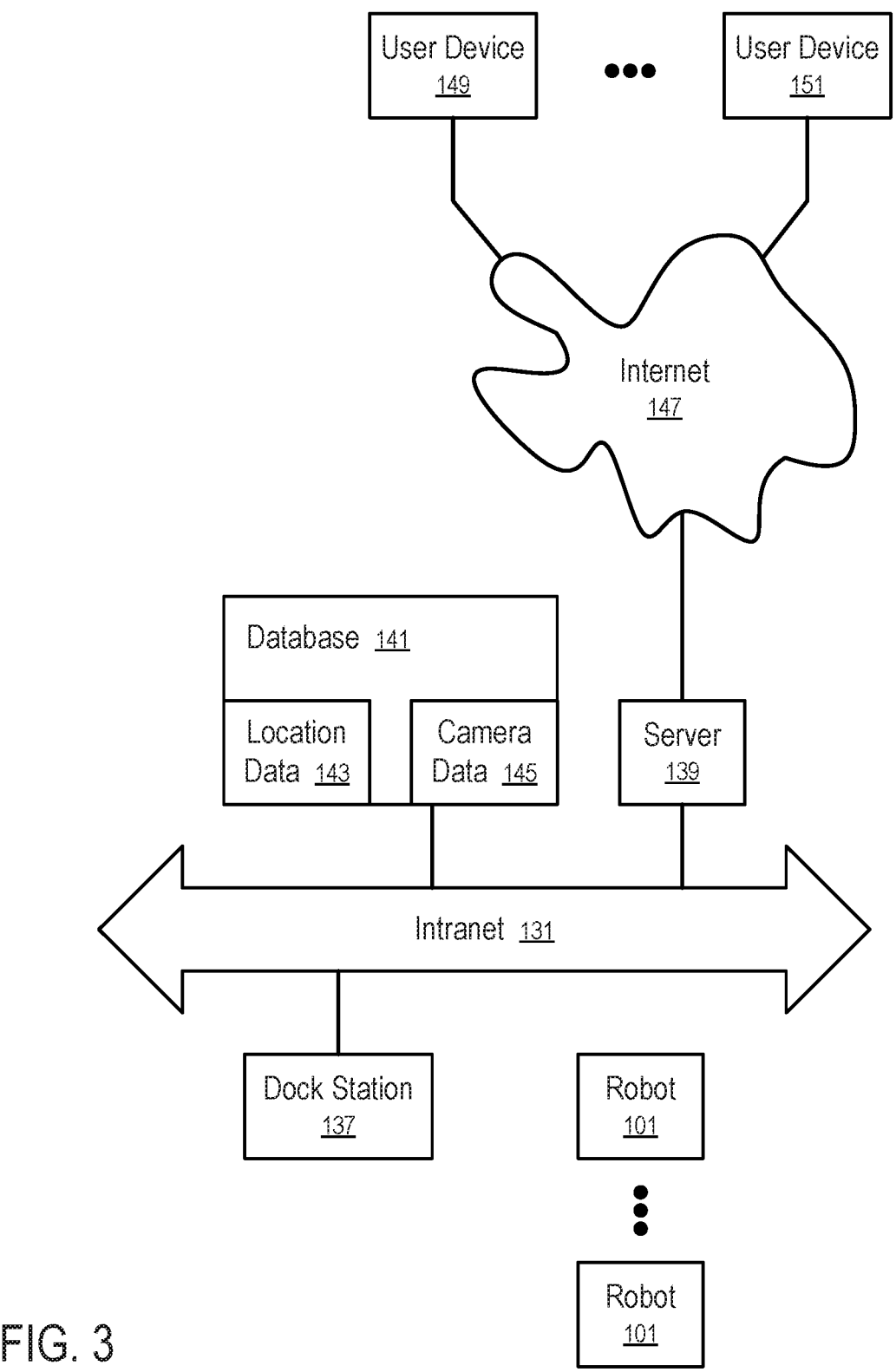
FIG. 3 shows a robotic system according to one embodiment.

In FIG. 1, the robot (101) has a connector (119) configured to be connected with the receptacle (117) of the dock station (137) to provide a wired connection to charge the battery of the robot (101) and/or provide a communication link for transferring data and/or instructions between the robot (101) and a server (e.g., as further illustrated in FIG. 3).

In one embodiment, the robot (101) includes an indoor position determination system that determines the position of the robot (101) within a building structure, such as a shopping mall. The controller of the robot (101) also includes map data of the shopping mall to guide the robot (101) to one or more locations programmed into the robot via a wired or wireless communication connection.

Figure 2:
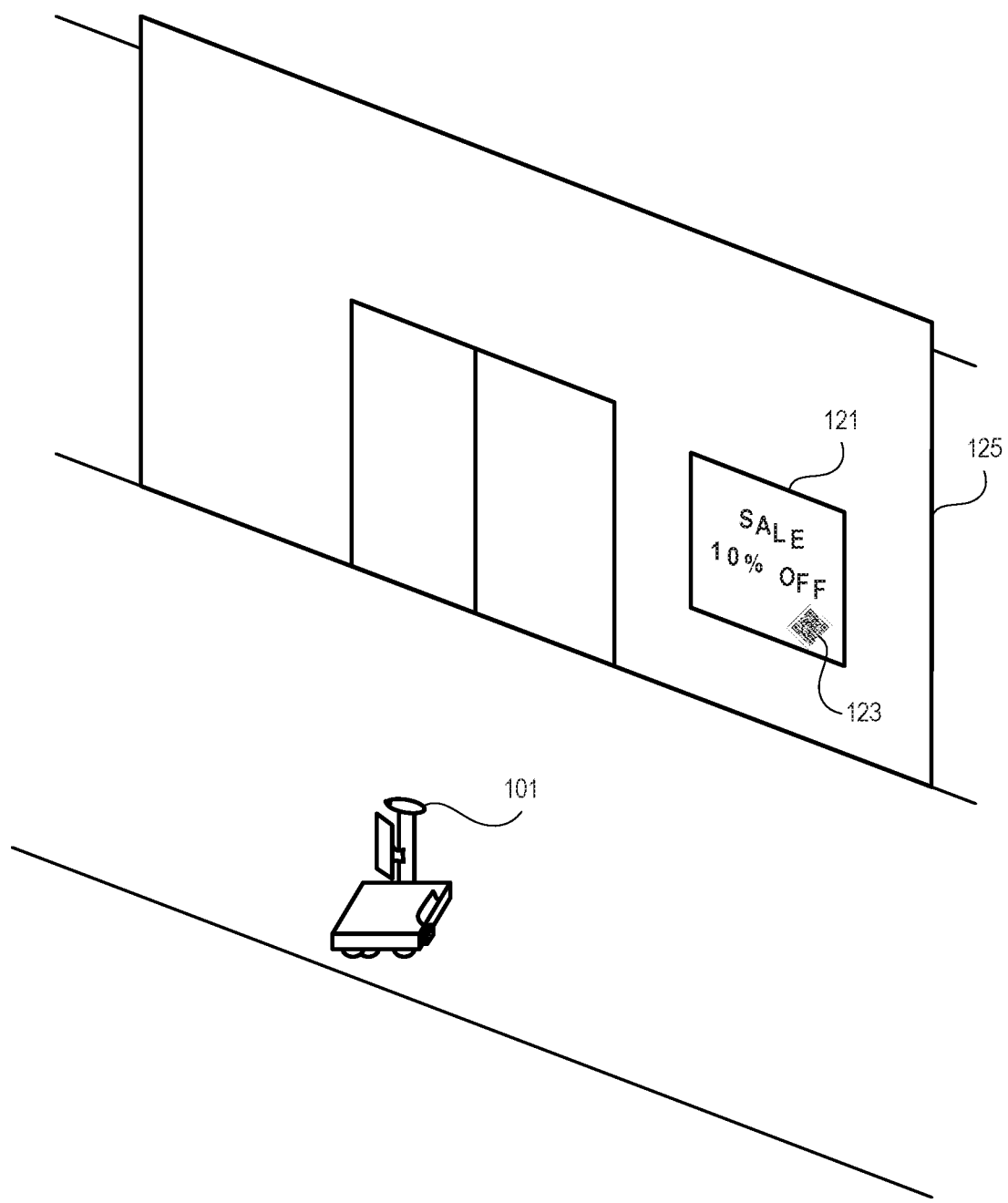
FIG. 2 illustrates an application of a robot according to one embodiment.

FIG. 2 illustrates an application of a robot according to one embodiment.

In FIG. 2, the robot (101) is configured to move inside a shopping mall. The robot (101) is instructed to take a 360 degree photo image of the surrounding at a location near a store front (125) and/or other locations near or in the store. For example, the store front (125) may have a posting (121) announcing a deal, such as a sales event, a discount offer, etc. The 360 degree photo image captured using the camera (109) of the robot (101) includes an image of the posting (121).

In one embodiment, optical character recognition (OCR) is performed on the image to extract the content of the posting. The postings may be filtered based on keywords, such as "sale" or "off", to obtain postings of a particular type, such as discount offers.

In one embodiment, the posting (121) may include a bar code (123); and the image of the bar code (123), as captured in the 360 degree photo image, is processed to determine the content of the bar code (123). For example, the bar code (123) may provide information about the posting (121) and/or an address of a web page from which further information about the posting (121) can be obtained.

Thus, the robot (101) can be instructed to move from a store front to another in a shopping mall, and take photo images that may contain the postings provided by the stores in the shopping mall. The images are processed by the robot (101) (or a server) to extract identify postings of interest, such as discount offers.

In one embodiment, the robot (101) is used to bring consumers, retailers, and technology partners together in ways that enhance the shopping experience. Specifically, the robot (101) can be used to capture data to allow customers to find and purchase products.

For example, the robot (101) can be used to make product catalogs available for search on web and mobile, such as the integration of real time inventory feeds from retailers to offer product availability for each store. The robot (101) can be used to capture offer and product availability information using the camera (109) mounted on the robot (101).

For example, the robot (01) can further be used to assist product purchase and fulfillment. The robot (101) can be used to deliver goods to a central location for fulfillment. For example, in services such as hands free shopping and centralized fashion lounge, the customers can try on clothing from several different retailers in one location, after the robot (101) collects the goods from different retailers in a shopping mall and delivery the collected goods to the current retailer location of the customer.

For example, a customer may order the goods from retailers in a shopping mall via phone or internet; and the robot (101) can be used to collect the goods from the retailers and transport the goods to a logistics partner which further delivers the goods to the customer. Alternatively, the collected goods can be placed in a centralized pickup location in the shopping mall, where the customer can pick up the goods ordered from different retailers in the mall.

For example, when the robot (101) visits a retailer in a shopping mall, a person in the retailer store may interact with the robot (101) on behalf of the retailer. The touch screen (103) provides a user interface that communicates to the persons items to be placed inside the storage space (107) of the robot (101) and/or retrieved from the storage space (107). Thus, the robot (101) can transport goods from and/or to the retailer.

Further, the robot (101) may receive offers and/or product inventory information from the representative of the retailer. For example, a computing device of the representative (e.g., a smart phone, a tablet computer, a computer having a dock station) can be used to transmit the information to the robot (101) via a wireless or wired connection.

The robot (101) may automatically obtain certain offers and/or product inventory information via the camera (109) taking photo images of postings inside the store and/or the store front of the retailer.

In some embodiments, the robot (101) takes still images and/or video images of the retailer location to provide an updated feed of the arrangement and display of goods in the retailer store. Thus, the still images and the video images can be organized as a virtual tour of the retailer store accessible via internet.

In one embodiment, a user may use a mobile computing device (e.g., a smart phone, a digital media player, a tablet computer) to do "Hands Free Shopping" in which the user does not have to carry the items to be purchased and/or have been purchased around the shopping mall. The user may use the mobile computing device to select the items of interest for purchase. The mobile computing device (e.g., having a mobile application running therein) communicates the list of items purchased by the user to the computing system of the retailer (or a centralized server for the shopping mall). Based on the list of items received from the mobile computing device, the robot (101) travels to the stores in the mall, collects from the stores the items purchased by the user, and transports the items at a convenience location for pickup, such as in a pickup area in the parking lot.

In one embodiment, the robot (101) is used to capture images of offline information for the indexing of the offline information in the real world. For example, the robot (101)

can be used to capture various types of data, from product information and availability to safety and security hazards within the shopping mall.

In one embodiment, the robot (101) has a cellular communications transceiver integrated within the touch screen (103), or disposed in the body (111). A communication link provided by the cellular communications transceiver can be used for the communication between the robot (101) and a remote server to process images, retrieve data, control the movement of the robot (101), and/or provide access to the storage spaces (107).

In one embodiment, the robot (101) has a position determination system configured to determine its position inside the shopping mall. The robot (101) is configured to identify the retailer stores based on its location within the shopping mall and/or beacon signals from the devices disposed in the retailer stores.

The robot (101) includes a wireless local area network transceiver (e.g., a WiFi transceiver). The robot (101) can be used to measure the signal strength of access points for the wireless local area networks within the shopping mall and generate a heat map of WiFi strength.

In one embodiment, the robot (101) is configured to perform autonomous scheduling of mapping and docking, without assistance from humans. For example, the robot (101) is programmed to un-dock at a defined frequency, collect/record mall data, re-dock and upload new content to be consumed via API remotely.

In one embodiment, the robot (101) includes a reader for radio frequency identification (RFID) tags. The robot (101) is configured to move into the retailer stores to scan RFID to obtain availability information items inside the store. For example, the scanning of the RFID tags allow the robot (101) to determine the presence of a particular item that is available for purchase at a particular location within a particular retailer store. The information is indexed for search, such that a user can quickly locate the item for inspection.

In one embodiment, the robot (101) includes a personal area network transceiver (e.g., Bluetooth transceiver) to perform a wireless docking connection with a dock station (137) when the robot (101) is with a predetermined distance to a docking station. The robot (101) may also move around the mall to measure Bluetooth signals and/or detect Bluetooth devices within the mall and correlate the detected signals/devices with the locations of the robot (101) at the time of the detection to generate a map of Bluetooth signals/devices within the mall.

In some embodiments, the robot (101) also includes a user interface for a customer to search for product availability information, reserve products, inspect a map of the mall, and obtain instructions to a particular location of a particular retailer where an item of interest to the user is located.

FIG. 3 shows a robotic system according to one embodiment.

In FIG. 3, an intranet (131) interconnects one or more dock station (e.g., 137), a server (139), and a database (141). The database (143) stores location data (143) (e.g., a digital map of the shopping mall, a commercial district), and camera data (145) uploaded from the robots (101).

The robots (101) are programmed to travel within a predetermined area (the shopping mall, a commercial district) autonomously and capture camera data (145) using their cameras (109). The camera data (145) is location tagged for correlation with the retailer locations identified in the location data (143).

In one embodiment, the robot (101) has a memory configured to store the camera data (145) before the data is updated to the database (141) via the dock station (137). A robot (101) may connect with the dock station (137) via a wired connection (e.g., via a USB connector) or a wireless connection (e.g., via Bluetooth or WiFi).

In FIG. 3, the server (139) provides a user interface (e.g., via a web server or a mobile application) that allows the users of the user devices (149, . . . , 151) to access the camera data (145).

For example, the 360 degree still or video images captured by the robot (101) allows a user of the user device (149) to view the shopping mall through the camera (109) of the robot (101) and thus obtain a virtual tour of the shopping mall. In one embodiment, the user interface is configured to receive instructions from a user to approach one of a set of authorized locations within the shopping mall to obtain a still image or a real time video feed from the camera (109) of the robot (101). The real time video, when presented via a virtual reality display device, provides a virtual reality experience in the shopping mall from a remote location. Thus, the robot (101) becomes a virtual representative of the user in the real world shopping mall, where the user may explore the merchandises provided in the shopping mall and make selections and purchases. A representative of a store may assist the robot (101) in completing certain operations, such as picking up an item for inspection, and purchase. The robot (101) transports the purchased items to an centralized location for shipping to the customer. Optionally, the customer may choose to travel to the centralized location to pick up the purchased items.

Further, in one embodiment, the server (139) (or the robot (101)) processes the camera data (145) to obtain postings (121) provided in a printed form on certain surfaces within the mall. For example, the discount offers are recognized via OCR and/or bar code; and thus, a discount offers can be communicated to the user devices (151) in various forms, such as advertisements, search results, a list of offers for browsing, etc.

Figure 4:
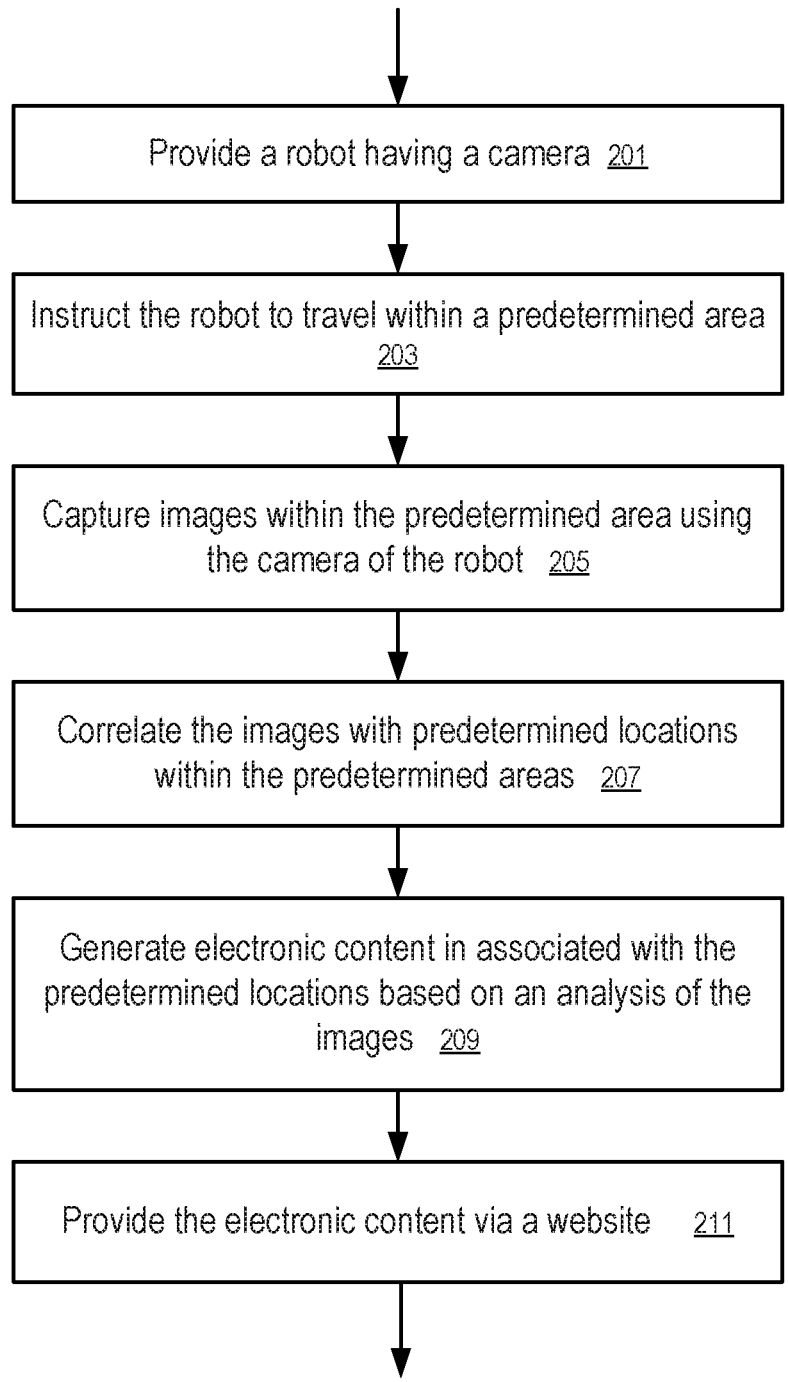
FIG. 4 shows a robotic method according to one embodiment.

FIG. 4 shows a robotic method according to one embodiment. For example, the method of FIG. 4 can be performed in a system illustrated in FIG. 3, using a robot (101) illustrated in FIG. 1 in an environment illustrated in FIG. 2.

In one embodiment, a robotic system is configure to: provide (201) a robot (101) having a camera (109); instruct (203) the robot (101) to travel within a predetermined area; capture (205) images within the predetermined area using the camera (109) of the robot (101); correlate (207) the images with predetermined locations within the predetermined areas; generate (209) electronic content in associated with the predetermined locations based on an analysis of the images; and provide (211) the electronic content via a website.

Figure 5:
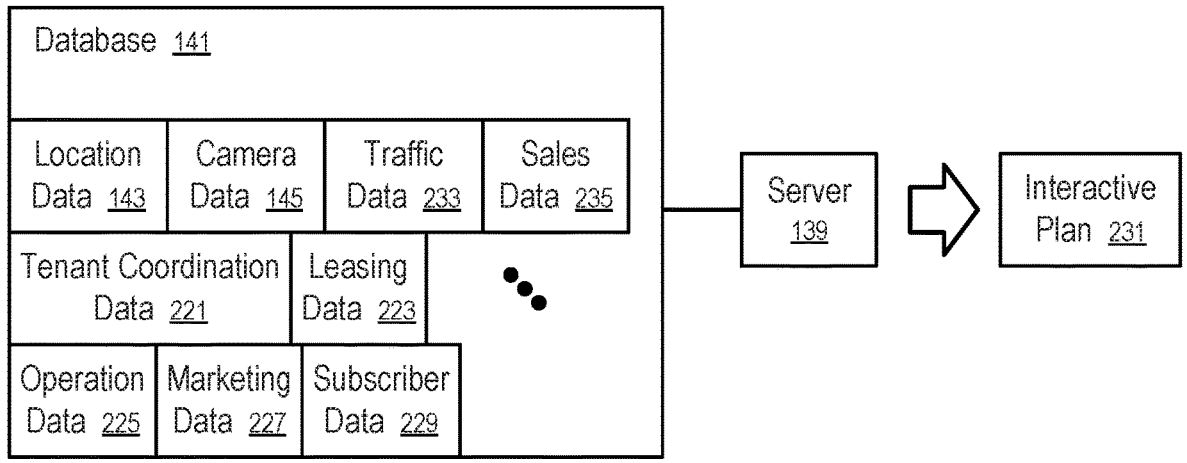
FIG. 5 shows a system configured to predict and present availability of resources according to one embodiment.

FIG. 5 shows a system configured to predict and present availability of resources according to one embodiment.

In one embodiment, the system of FIG. 5 provides a platform for securing short-term leases for temporary retail marketplaces in a shopping mall. It can be used to meet the need for leasing temporary retail spaces in a shopping mall in a structured and profitable way. There is currently no formalized method in the retail leasing market that allows for potential tenants to connect with a temporarily-available or 'pop-up' retail space.

The system of FIG. 5 creates a marketplace for pop-up retail space by automatically predicting future, temporary vacancies and filtering that data into a platform that is accessible by external subscribers. The platform allows subscribers to view available space but also to make offers and enter into agreements in a streamlined way, without the use of a real estate broker.

In one embodiment, the system of FIG. 5 includes a subscription mechanism and a marketplace tool that acts as a customer database, building profiles on prospective retailers and generating leads beyond the scope of traditional brokerage-based methods.

In one embodiment, the system of FIG. 5 includes an Enterprise Resource Planning tool to aggregate, correlate and predict future temporary vacancies and the use of the subscription service to publicly offer temporary retail space for lease.

In one embodiment, the database (141) and the server (139) includes an Enterprise Resource Planning Tool (ERP); and a pop-up retail marketplace (PRM) is a module plugged in the Enterprise Resource Planning Tool (ERP) to aggregate data from the three departments: Leasing, Tenant Coordination, and Operations, into a single user interface. The database (141) provides a centralized location for leasing data (223), tenant coordination data (221), operation data (225), market data (227) and subscriber data (229).

In one embodiment, the leasing data (223) includes sales brochures, development plans, lease terms and exhibits, financial and lease status; the tenant coordination data (221) includes lease plans, tenant design submissions, schedules, project status and approvals; the operation data (225) includes Automated Clearing House (ACH) data for recurring payments, monthly statements and current balance, archive of any correspondence between tenant and landlord, retailer sales, lease violations, emergency contact information, before/after hours request, maintenance requests; tenant handbooks, certificate of insurance, storefront photos, etc.; and the marketing Data (227) includes social media request, marketing tools, contact information, newsletters.

In FIG. 5, the server (139) is configured to provide an interactive plan (231) as a user interface to access the ERP data.

For example, the user may use the user interface to select a shopping mall to see the plan of the shopping mall. Data of each individual retailer in the shopping mall is saved in association with the plan of the shopping mall. The user interface provides the user with the options to: manually select individual items of data related to individual retailers; correlate individual data across multiple retail spaces within the plan of the shopping mall; select multiple data fields across multiple retail spaces within the plan of the shopping mall; and/or correlate multiple data results against the remainder of the portfolio.

Using data from the database (141) of the Enterprise Resource Planning tool, a Pop-Up Retail Marketplace application is implemented as a web-based application hosted on the server (139), accessible via a web page online or a mobile application. This application allows the user to: correlate against lease start date, or renewal date for any new lease on same space; identify all leases across the portfolio that are due to expire within the next 6-12 months; if a retail space is subject to new lease, correlate against tenant design progress and schedule; send results notice to leasing executive for verification, where the leasing executive is required to verify results; correlate the results against the progress of new tenants or renovations within the retail space; feed that data to a marketplace that connects retailers looking for a pop-up store opportunity, with vacancies across the mall portfolio; vet subscribers at different levels through the system/people; and strategically show temporary openings in accordance with leasing requirements/requests.

In the FIG. 5, the subscriber data (229) controls access by subscribers to the pop-up retail marketplace. The subscribers are given access to the vacancy data, along with profiles of individual centers across the portfolio. Subscribers and/or subscriber data (229) can be gained through partnerships with third party applications, etc. In one embodiment, the subscribers have the opportunity to request available space within a certain time period.

Once applications for a retail space are received from the subscribers, the Pop-Up Retail Marketplace application sends the requests for review. A review committee selects the most appealing tenant for the space and a notice of approval is generated through the Pop-Up Retail Marketplace application. The successful tenant enters into an agreement to lease the space on a short-term basis, and also consents to having their performance tracked using technology, sales results, heat-mapping etc. They also consent to make their website traffic and sales analytics available to the server (139) over the course of the pop-up period. Click-throughs of the website of the tenant are monitored. The tenant's performance is tracked against their user profile in the Pop-Up Retail Marketplace application. The Pop-Up Retail Marketplace application provides authorized users with access to the performance of pop-up stores across the portfolio. Successful performance increases the rating of the tenant, which automatically gives them preference in future transactions.

In one embodiment, the camera data (145) collected by the robot (101) is analyzed to generate at least portion of the operation data (225), indicating the customer traffic level (233) in the retail space, detecting the sales events (235), such as out of business sales, clearance sales, moving sales, grand opening sales, etc.

The system as configured in FIG. 5 saves employee time which could result in head count and reduced expenses. It offers a new competitive advantage over others in the industry. Subscribers will have access to all spaces available across the shopping mall portfolio at one centralized location. It offers a single user interface (e.g., interactive plan (231)) for the retailer rather than having to deal with multiple contacts, formalized way to track and monitor leads for leasing, formalized way to receive requests for marketing and facilities, and avoids the need for a retail broker. It offers a seamless experience for the retailer where everything is completed through the marketplace and ERP. It uses a single brand identity to present retail spaces to future and potential retailers.

The platform as illustrated in FIG. 5 can quickly fill empty retail spaces and generate new income, identify 'new' retailers who are seeking to make a transition from online-only to physical retail space—blending the world of online and physical, assess the performance of these retailers, thereby establishing a database of successful retailers who may, in the future, seek or be offered permanent retail space. This allows not only short term revenue but a new system to vet potential long term tenants. The platform provides opportunities for brand or event partnerships with the most exciting technology and e-commerce brands that have traditionally not occupied mall space.

The platform as illustrated in FIG. 5 establishes a constant roster of temporary activations, drive new traffic to the mall as well as encourage new traffic patterns within the mall. It offers potential new income stream from cross-licensing the marketplace to other developers or organizations.

The platform as illustrated in FIG. 5 can be used to support a retail incubator. The single connection point between cutting edge online retailers and physical retail space and therefore expanding the reach beyond traditional mall retailers and customers.

Figure 6:
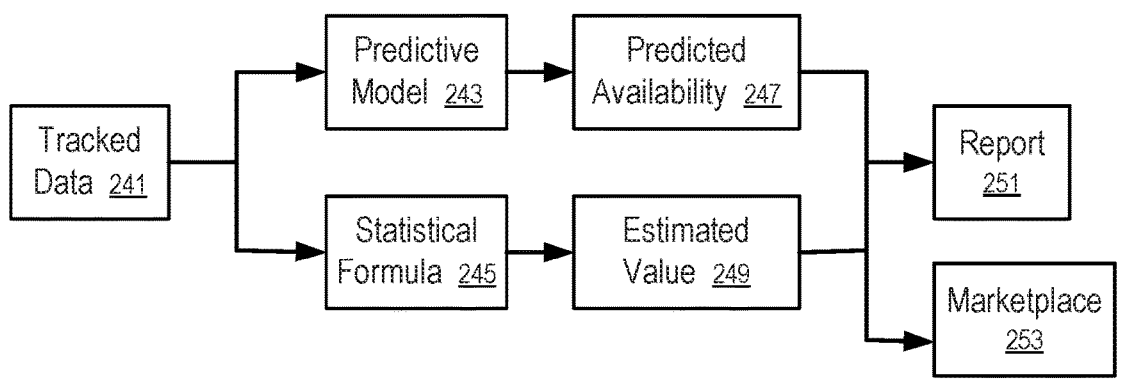
FIG. 6 shows a system to provide availability prediction and value estimation according to one embodiment.

FIG. 6 shows a system to provide availability prediction and value estimation according to one embodiment.

In FIG. 6, the server (139) uses a predictive model (243) on the tracked data (241) (e.g., as illustrated in FIG. 5) to generate predicted availability (247) of retail spaces in a predetermined time period in the future, which allows the server (139) to present both retail spaces that are currently available and retail spaces that will be available in the future in reports (251) and marketplace (253). The prediction can be made based on the lease expiration information in the leasing data (223), the tenant coordination data (221) and the operation data (225).

In FIG. 6, the server (139) uses a statistical formula (245) on the tracked data (241) (e.g., as illustrated in FIG. 5) to generate an estimated value (249) of each available retail space. In one embodiment, the server (139) presents both the predicted availability (247) and the estimated value (249) of retail spaces in the reports (251) and/or the marketplace (253). In one embodiment, the marketplace (253) of retail spaces is presented via the interactive plan (231) hosted on a website and accessible via web browsers. Alternatively, the interactive plan (231) can be implemented via mobile applications running in mobile devices using data from the server (139).

In one embodiment, the server (139) and the database (141) provide a retailer space inventory forecasting tool that aggregates and analyzes multiple data sources that have previously never been brought together. The system then uses an algorithm to correlate and convert that data into a variety of actionable outcomes. For example, the tool aggregates and correlates data from existing sources to predict temporary vacancies across the portfolio of retailer spaces in a physical shopping mall. This type of information would include WLMS (lease and deal data of the retailer spaces), tenant design and construction, traffic and sales, consumer trends, lease history, category performance, trade and demographic information. Once the information is collected the algorithm predicts inventory and value of each available space. Because of the traffic and sales figures collected, the algorithm can rank the value of each potential space which would help leasing determine cost. The tool pulls data from multiple existing and new technology sources, including but not limited to: WLMS (lease and deal data), tenancy coordination website (tracks design and construction of new tenants and refurbishments), retailer sales results, Shopper-Trak, mall location management technology (beacons), market research software, inventory management software, traffic and sales trends, searchable mall (able to see retailers inventory levels and build a predictive model based on their performance), etc.

The retailer space inventory forecasting tool forecasts permanent vacancies (e.g., long term availability without a predetermined time limit) and temporary vacancies (e.g., short time availability with a predetermined time limit that identifies the end of the vacancy period) and their monetary value to help the business generate additional income. It provides better knowledge of how much demand there is, which could in turn reduce or increase pricing depending on each market. The application algorithm uses the existing data inputs to generate new predictive data about retailers within the mall.

For example, in one variation the application analyses existing lease expiry dates with the progress of new design and construction within the same space to identify potential short term vacancies. This information is analyzed against current lease data to assign value to the temporary space. This information can be fed directly to a retail pop-up marketplace.

For example, in another variation, the application analyses retailer sales results against mall tracking technology to identify areas within the mall that are likely to fall below sales quotas and pose vacancy risks. Those vacancy risks are, in turn, analyzed against market research technology to identify which subset poses exceptional risk.

For example, in a further variation, the application analyses potential vacancies against market trends and mall traffic to predict merchandising opportunities for each space. The value of different configurations can then be analyzed by the application to generate optimum combinations.

Quantitative forecasting provided by the tool leads to automated decisions to allow for additional income.

In one embodiment, the server (139) uses the data in the database (141) to identify risk in the leasing structure and assign value to the identified risk. Examples of data that can be used to identify and quantify the risk include: space type (inline, big box, kiosk etc.), tenant type (boutique, fast fashion, food retail, restaurant etc.), occupancy ratio, leasing revenue, lease term, sales information, accounts receivable data (balance outstanding, overdue etc.), tenant financial health, brand sentiment/market sentiment data, and design and construction schedules for tenant build-outs. The data can be processed through a variety of statistical formulas and models, including but not limited to: ordinary least squares, k-nearest neighbors linear regression, logistic regression, k-means clustering, etc. The algorithm weights the data points against each other to determine the risk of a tenant vacating, and calculates the financial risk associated with that vacancy. In addition, the algorithm will look at downtimes between tenant expiries and RCD's to identify opportunities for additional income.

In one embodiment, the interactive plan (231) is configured to present planned availability and unplanned availability. Planned availability is the actual space availability that occurs in between tenant expiries and new tenant RCDs. Unplanned Availability is the predicted vacancy of "at-risk" tenants that would result in lost cash flow. The server (139) is configured to compute the value of planned availability of retailer spaces based on the downtime between coming and going tenants and incorporating an achievable rental rate (e.g., rent per unit area of a retail space ($/sf)) for pop-up shops as specified by the leasing department. The server (139) is configured to compute the value of unplanned availability of retailer spaces based on the lost cash flow for the remainder of the lease in accordance with the net present value of the tenancy and any capital associated with the space to determine actual value of the vacancy. The loss can also be correlated with potential financial gain, through leasing that space on a pop-up basis.

In one embodiment, the interactive plan (231) includes a virtual reality component that allows the user to walk through a 3D visual representation of the mall where the retail spaces are located, look at where the potential vacancy would be and choose based on aesthetic in addition to financial liability.

In one embodiment, the server (136) presents the opportunity in the form of greatest to least in the values of the availabilities; and the risk in terms of most probable to default, value of lease in new potential vacancy (NPV), or greatest risks from probability multiplied by NPV.

In one embodiment, the data provided about a tenant is used to classify the tenant according to risk of vacancy (e.g., low, medium, or high); and when the risk is above a threshold, the leasing department is notified to start looking for a new tenant for the space occupied by the current tenant.

In one embodiment, the server (139) is configured to calculated projects based on the risk (e.g., if the tenant leaves after 5 years of a 10 year lease the loss will be XXX; if the tenant leaves after 9 years of a 10 year lease the income loss will be ZZZ.).

In one embodiment, the server (139) is configured to generate a report (251) that specifically targeted at particular teams within the management of the mall (e.g., leasing, finance, project control group).

In one embodiment, new design and construction in a given space are analyzed against vacancy data to determine if a temporary, or 'pop-up' space may be viable. Specifically, the algorithm would draw from the estimated completion date of new tenant fit out work and correlate that to the estimated vacancy date of an existing tenant. This would generate a financial analysis as to the potential opportunity cost of implementing a pop-up retail space.

In one embodiment, the marketplace is a Web based application separate from the data feed and the primary application. With a subscription it shows availability based on mall/center, center data and an application process. Subscribers to the Retail Marketplace are given access to the vacancy data, along with profiles of individual centers across the portfolio and provided with the opportunity to request available space within a certain time period. The subscribers may be gained through partnerships with other organizations.

In one embodiment, the marketplace (253) is configured to receive applications to rent the vacated spaces. The system sends the requests/applications to a review committee for review. The review committee selects the most appealing tenant for the space and a notice of approval is generated through the system. The successful applicant/tenant enters into an agreement with the mall to lease the space on a short-term basis, and also consents to having their performance tracked using Westfield technology, sales results, heat-mapping etc. They also consent to make their website traffic and sales analytics available to Westfield over the course of the pop-up period. Click-throughs etc. are monitored. The tenant's performance is tracked against their user profile in the system. The server (139) can then access the performance of pop-up stores across the portfolio. Successful performance increases the tenant's rating, automatically giving them preference in future transactions.

The advantages of the marketplace (253) include: saving employee time which could result in head count and reduced expenses; a new competitive advantage over others in the industry; subscribers will have access to all spaces available across a mall portfolio at one centralized location; single user interface for the retailer rather than having to deal with multiple contacts; formalized way to track and monitor leads for leasing; formalized way to receive requests for marketing and facilities; the ability to avoid the use of a retail broker; a seamless experience for the retailer—everything is completed through the marketplace; and single brand identity to present to future and potential retailers.

In one embodiment, the server (139) uses previous tenant defaults as benchmarks to measure against. A k-means clustering statistical model is used to group tenants by high, medium and low risk based on sales results/sales quotas. A linear regression statistical model is used to measure the probability a tenant is to default. A k-nearest neighbor statistical model is used to look and find similar tenants by a myriad of different distance measurements. If a tenant is found to be similar to struggling or defaulted tenants based on sales results/sales quotas, the tenant is determined to have the same risk as the defaulted tenants.

Figure 7:
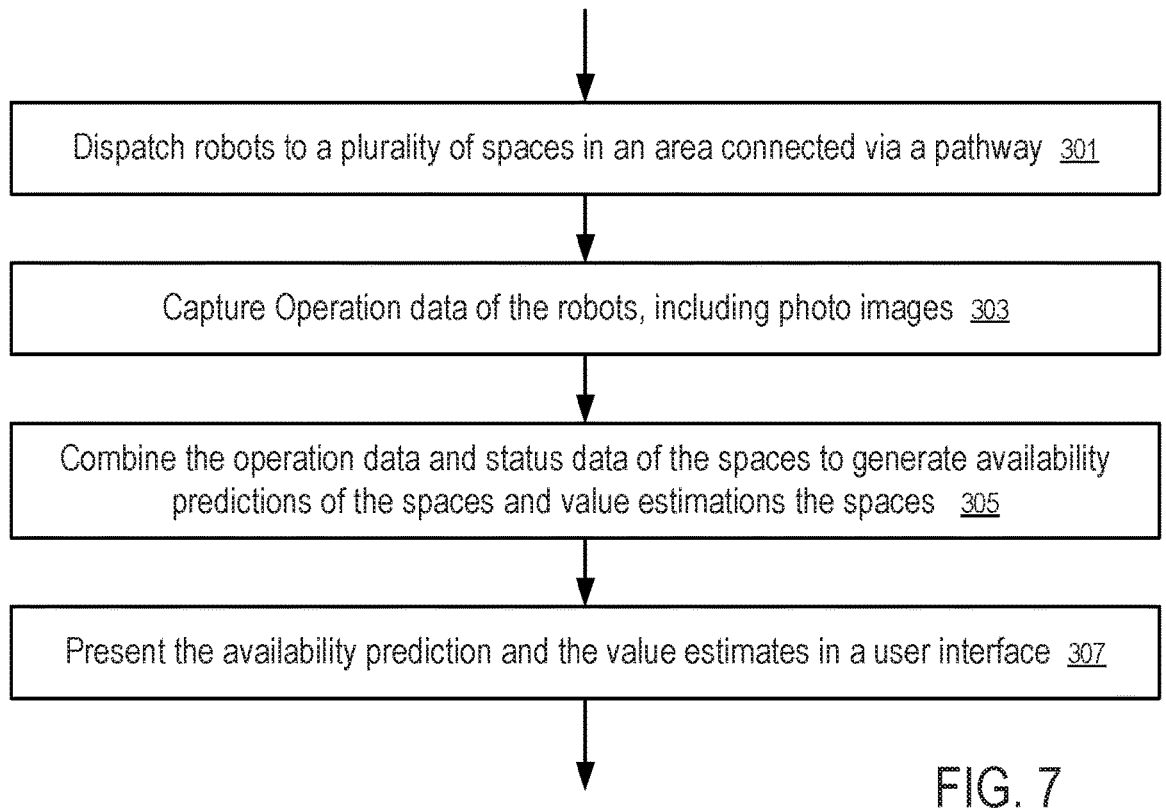
FIG. 7 shows a method to provide availability prediction and value estimation according to one embodiment.

FIG. 7 shows a method to provide availability prediction and value estimation according to one embodiment. For example, the method of FIG. 7 can be implemented in a system illustrated in FIG. 5.

In FIG. 7, a computing system is configured to: dispatch (301) robots (101) to a plurality of spaces in an area connected via a pathway; capture (303) operation data of the robots, including photo images; combine (305) the operation data and status data of the spaces to generate availability predictions (247) of the spaces and value estimations (249) the spaces; and present (307) the availability prediction and the value estimates in a user interface (e.g., 231, 251, or 253).

In one embodiment, the computing system includes: a set of robots, a database, a server, and a user interface. Each respective robot in the set of robots includes: a moving mechanism configured to move the robot on a pathway; a controller configured to operate the robot within an area having a plurality of spaces connected by the pathway; a body having a shape configured to carry items for delivery; and a camera mounted on the body and controlled by the controller to take photo images in the area. The database stores: status data of the spaces, and operation data of the robots dispatched to the spaces, including photo images obtained using cameras of the robots. The server is connected to the database and configured to combine the status data and the operation data of the robots to generate a prediction of availability of the spaces. The user interface is configured to present the prediction.

In one embodiment, the robots are dispatched to carry items sold by stores at the spaces to a centralized location for pick up; and the operation data includes sales data related to delivery of the items from the spaces to the centralized location.

In one embodiment, the robots are configured to capture the photo images while being dispatched to the spaces; and the server is configured to analyze the photo images to determine measurements of the foot traffic in the area, wherein the prediction is based at least in part on the measurements of the foot traffic in the area.

In one embodiment, the user interface includes an interactive plan of vacancy of spaces in the area; and the interactive plan is configured to present the availability of the spaces and accept applications for leasing spaces predicted to be available in the area.

In one embodiment, the prediction includes availability and values of the spaces for rental in a period of time.

In one embodiment, the status data includes: leasing data of the spaces in the area, tenant coordination data, operation data, and subscriber data; and the prediction is based at least in part on the leasing data, the tenant coordination data, and the operation data.

In one embodiment, the computer system is configured to perform a method, including: providing the set of robots; dispatching the robots to the spaces; capturing operation data of the robots, including photo images obtained using cameras of the robots; storing, in the database, status data of the spaces and the operation data of the robots; combining, by the server connected to the database, the status data and the operation data of the robots to generate a prediction of availability of the spaces; and providing a user interface to present the prediction.

In one embodiment, the robots are configured to carry items from the spaces to a centralized location for pick up.

In one embodiment, the operation data includes sales data related to delivery of the items from the spaces to the centralized location.

In one embodiment, the area having the spaces includes a shopping mall; and the spaces are retail spaces.

In one embodiment, the prediction includes availability of the retail spaces for rental in a period of time.

In one embodiment, the prediction includes rental values of the retail spaces in the period of time.

In one embodiment, the robots are configured to capture the photo images that are indicative of foot traffic in the area; and the method further comprises: analyzing the photo images to determine measurements of the foot traffic in the area, wherein the prediction is based at least in part on the measurements of the foot traffic in the area.

In one embodiment, the status data includes: leasing data of the spaces in the area, tenant coordination data, operation data, and subscriber data; and the prediction is based at least in part on the leasing data, the tenant coordination data; and the operation data.

In one embodiment, the prediction is generated using at least one of: least squares regression line; k-nearest neighbors; linear regression; logistic regression; and k-means clustering.

In one embodiment, the user interface includes an interactive plan of vacancy of spaces in the area.

In one embodiment, the interactive plan is configured to present the availability of the spaces and accept applications for leasing spaces predicted to be available in the area.

In one embodiment, the spaces predicted to be available in the area are offered as spaces for pop-up retails.

In one embodiment, a non-transitory computer storage media stores instructions configured to instruct a computing apparatus to perform any of the methods disclosed herein.

Figure 8:
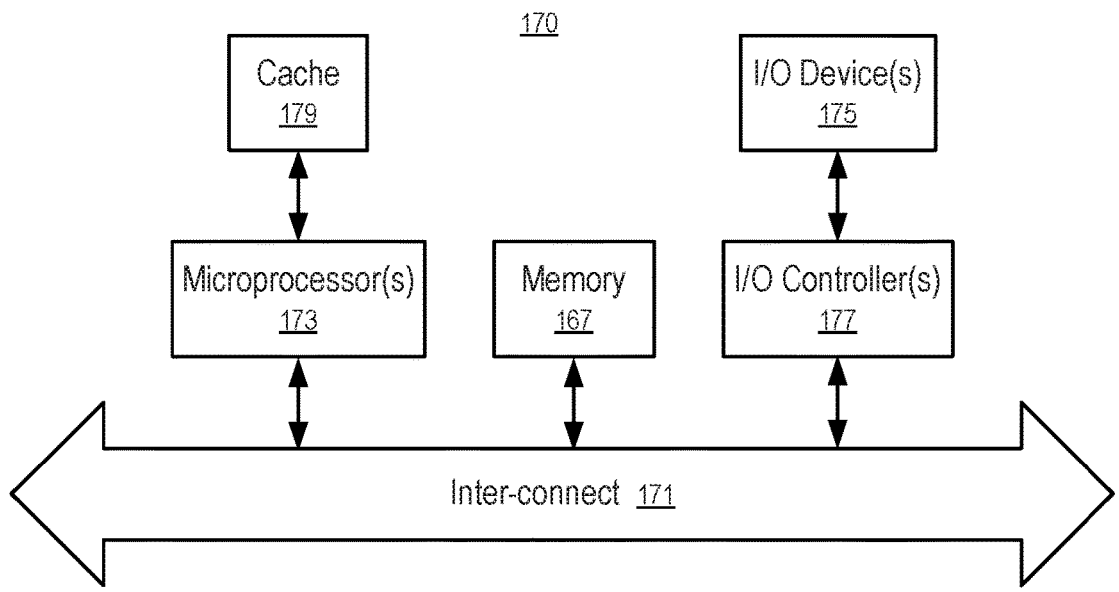
FIG. 8 shows a data processing system that can be used to implement some components of a robotic system according to one embodiment.

FIG. 8 shows a data processing system that can be used to implement some components of a robotic system according to one embodiment. For example, the data processing system of FIG. 8 can be used to implement each of the controller of the robot (101), the dock station (137), the server (139), and/or the database (141) discussed above.

While FIG. 8 illustrates various components of a computer system, it is not intended to represent any particular architecture or manner of interconnecting the components. One embodiment may use other systems that have fewer or more components than those shown in FIG. 8.

In FIG. 8, the data processing system (170) includes an inter-connect (171) (e.g., bus and system core logic), which interconnects a microprocessor(s) (173) and memory (167). The microprocessor (173) is coupled to cache memory (179) in the example of FIG. 8.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
providing a set of robots configured to operate within an area having a plurality of spaces, wherein each robot includes at least one mounted camera;
capturing operation data of the robots, including photo images obtained using the cameras of the robots;
storing status data pertaining to leasing of the spaces and the operation data of the robots;
generating a prediction of leasing availability of the spaces based on the status data and the operation data of the robots; and
presenting the prediction in a user interface, wherein the user interface includes an interactive plan of vacancy of spaces in the area.

2. The method of claim 1, wherein the interactive plan is configured to present the leasing availability of the spaces and accept applications for leasing spaces predicted to be available in the area.

3. The method of claim 1, wherein the robots are configured to carry items from the spaces to a centralized location for pick up.

4. The method of claim 3, wherein the operation data includes sales data related to delivery of the items from the spaces to the centralized location.

5. The method of claim 4, wherein the area having the spaces includes a shopping mall; and the spaces are retail spaces.

6. The method of claim 5, wherein the prediction includes leasing availability of the retail spaces for rental in a period of time.

7. The method of claim 6, wherein the prediction includes rental values of the retail spaces in the period of time.

8. The method of claim 1, wherein the robots are configured to capture the photo images that are indicative of foot traffic in the area.

9. The method of claim 8, further comprising:
analyzing the photo images to determine measurements of the foot traffic in the area, wherein the prediction is based at least in part on the measurements of the foot traffic in the area.

10. The method of claim 1, wherein the status data includes: leasing data of the spaces in the area, tenant coordination data, operation data, and subscriber data; and the prediction is based at least in part on the leasing data, the tenant coordination data, and the operation data.

11. The method of claim 10, wherein the prediction is generated using at least one of:
least squares regression line;
k-nearest neighbors;
linear regression;
logistic regression; and
k-means clustering.

12. The method of claim 1, wherein the spaces predicted to be available in the area are offered as spaces for pop-up retails.

13. A system, comprising:
a set of robots configured to operate within an area having a plurality of spaces, wherein each robot includes at least one mounted camera;
a database storing:
status data pertaining to leasing availability of the spaces, and
operation data of the robots, including photo images obtained using the cameras of the robots;
a server connected to the database and configured to generate a prediction of leasing availability of the spaces based on the status data and the operation data of the robots; and
a user interface configured to present the prediction, wherein the user interface is further configured to include an interactive plan of vacancy of spaces in the area.

14. The system of claim 13, wherein the interactive plan is configured to present the leasing availability of the spaces and accept applications for leasing spaces predicted to be available in the area.

15. The system of claim 13, wherein each robot further includes:
a moving mechanism configured to move the robot on a pathway, and
a controller configured to operate the robot on the pathway.

16. The system of claim 13, wherein the robots are dispatched to carry items sold by stores at the spaces to a centralized location for pick up; and the operation data includes sales data related to delivery of the items from the spaces to the centralized location.

17. The system of claim 13, wherein the robots are configured to capture the photo images while being dispatched to the spaces; and the server is configured to analyze the photo images to determine measurements of the foot traffic in the area, wherein the prediction is based at least in part on the measurements of the foot traffic in the area.

18. A computer program product comprising computer-readable program code capable of being executed by one or more processors when retrieved from a non-transitory computer-readable medium, the program code comprising instructions configurable to cause:
capturing operation data of a plurality of robots configured to operate within an area having a plurality of spaces, wherein each robot includes at least one mounted camera, the operation data including photo images obtained using the cameras of the robots;
storing status data pertaining to leasing of the spaces and the operation data of the robots;
generating a prediction of leasing availability of the spaces based on the status data and the operation data of the robots; and
presenting the prediction in a user interface, wherein the user interface includes an interactive plan of vacancy of spaces in the area.

19. The computer program product of claim 18, wherein the interactive plan is configured to present the leasing availability of the spaces and accept applications for leasing spaces predicted to be available in the area.

20. The computer program product of claim 18, wherein each robot further includes:
a moving mechanism configured to move the robot on a pathway, and
a controller configured to operate the robot on the pathway.

* * * * *